May 17, 1927.
L. D. LOVEKIN
AUTOMATIC SHUT-OFF VALVE
Filed July 21, 1925
1,628,675
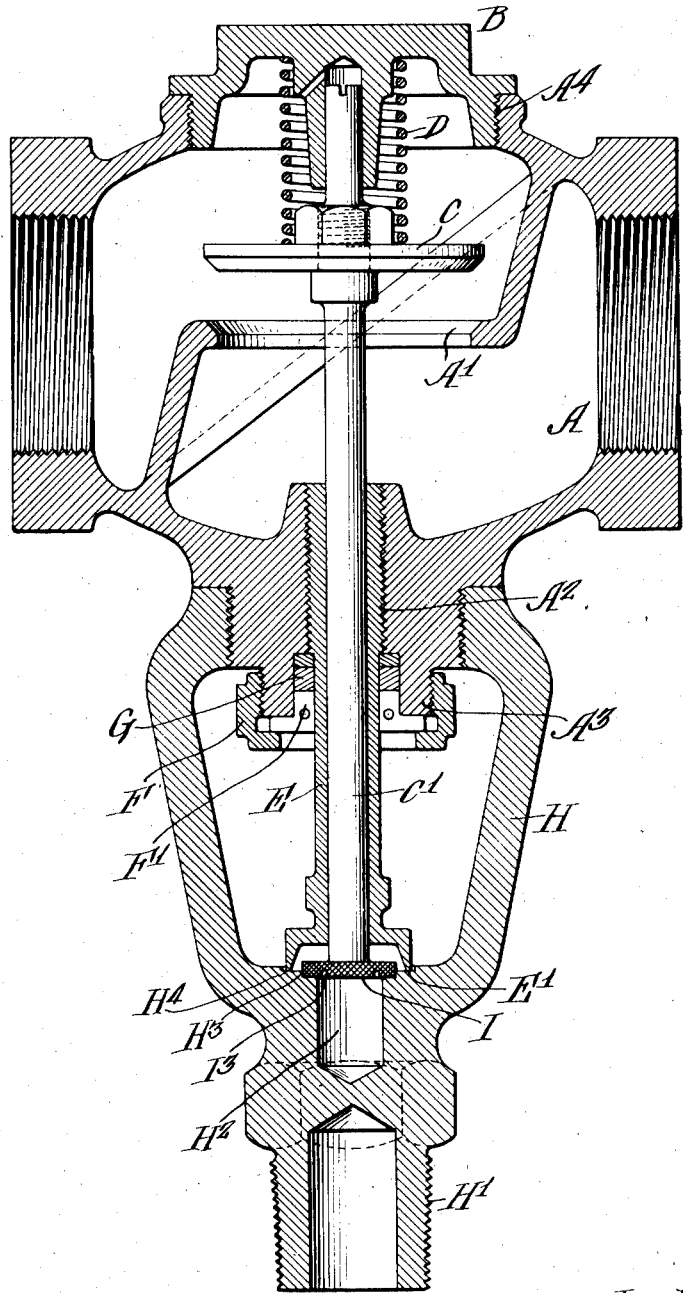
Inventor.
Luther D. Lovekin
by Francis D. Chambers
his Attorney.

Patented May 17, 1927.

1,628,675

UNITED STATES PATENT OFFICE.

LUTHER D. LOVEKIN, OF WYNNEWOOD, PENNSYLVANIA.

AUTOMATIC SHUT-OFF VALVE.

Application filed July 21, 1925. Serial No. 44,994.

My invention relates to automatic shut off valves intended for use in fuel conduits and operating to close and shut off the flow of fluid fuel where for any reason the temperature exceeds a determined amount. The objects which I have in view are to provide a device of the kind indicated in which the valve will close with an abrupt movement when the critical temperature is reached and also to provide a construction which will have the minimum resistance to valve closing from friction and at the same time be free from liability to leakage of the fluid fuel.

In my construction I make use of an abutment of fusible metal as a means of holding the valve in open position and a leading feature of my invention consists in employing a stop of fusible metal in the form of a plate extending in the path of the plunger which holds the valve open and for an open space lying also in the path of the plunger so that when the plunger has fractured or perforated the plate it will be free to move in the open space until the valve with which it is connected is seated. By preference I form the plate of fusible metal in the form of a disk supported at its edges and extending over an open space which when the disk is in place forms a closed chamber so that the air contained in this chamber cannot escape. By preference also I form in the rear side of the disk an annular groove surrounding the portion of the plate against which the plunger abuts and which I have found will facilitate the breaking through of the plunger when the critical temperature is reached.

Another important feature of my invention consists in the constructive features hereinafter described by means of which the movement of the valve and plunger can occur without resistance from friction while at the same time the escape of the fluid fuel is effectually prevented.

Reference being now had to the drawing which illustrates my invention, and which shows a sectional elevation of a valve embodying my improvement.

A indicates the valve casing forming a part of a conduit for fluid fuel, either gas or oil. $A^1$ is the valve seat in the casing; $A^2$ a threaded passage formed through the casing. $A^3$ is an externally threaded annulus extending from the casing and forming a part of the stuffing box. $A^4$ is an internally threaded passage formed through the casing, into which screws the cover indicated at B. C is the valve, from which, as shown, extends the plunger indicated at $C^1$. D is a spring acting to press the valve C toward its seat. E is a guide tube for the plunger $C^1$, formed with a threaded end which screws into the threaded opening $A^2$ and with an annular seat $E^1$ at its outer end. F is a stuffing box ring screwing on the threaded annulus $A^3$ and acting on the split gland as indicated at $F^1$; G indicating the stuffing in the stuffing box. H is a fitting screwing on the threaded portion $A^3$ of the casing and having as shown a threaded end $H^1$ adapted to be screwed into the hot water container. In the fitting H and close to the portion of this fitting which screws into the hot water container I form a chamber $H^2$ around the edge of which is formed the seat $H^3$ for the fusible metal disk and the seat $H^4$, against which the annular seat $E^1$ of the tube E fits and makes a tight joint. I is a disk of fusible metal fitting on the seat $H^3$, and preferably formed as indicated with an annular groove $I^3$ on its rear face.

In operation the fusible metal plate of whatever form it may be desired to use, is placed in the seat provided for it and the plunger $C^1$ abutted against the plate as shown so as to keep the valve C open. The tubular guide is then screwed out until its annular bearing $E^1$ forms a tight joint with a permanent seat $H^4$. The pressure exerted on the screw threads will for most purposes, form a tight joint to prevent the escape of gas or oil, but for greater precaution I prefer to employ a stuffing box as shown and described, which will effectually prevent the escape of gas from the casing around the tube E, while of course the escape of gas from the inside of the tube is prevented by the seating of its annular seat $E^1$.

When the temperature to which the fusible metal plate I or $i$ is exposed exceeds a determined amount, the resisting power of the fusible metal is so impaired that the action of the spring D through the plunger $C^1$ will break or perforate the plate, permitting a quick closing action of the valve. The chamber lying beneath the fusible plate must of course be of such dimensions as to permit the free movement of the plunger after the supporting plate has broken or become perforated.

When my safety appliance is used in connection with a hot water container I have found it advisable that the chamber over which the fusible plate extends be of such a character as to be entirely closed by the plate, so that any air contained in it will become heated to the temperature of the surrounding metal.

Having now described my invention, what I claim as new and desire to secure by Letters Patent, is:

1. In combination with a valve casing adapted to be located in a conduit for fluid fuel, a valve, means tending to seat said valve, a plunger extending from the valve through the wall of the casing, a guide tube for the plunger screwing into the wall of the casing and extending beyond the same, said tube having an annular seat formed at its outer end, a support for a fusible stop and an abutment against which the annular seat on the tube can be screwed, and a fusible stop for the plunger located to hold the valve open.

2. In combination with a valve casing adapted to be located in a conduit for fluid fuel, a valve, means tending to seat said valve, a plunger extending from the valve through the wall of the casing, a guide tube for the plunger screwing into the wall of the casing and extending beyond the same, said tube having an annular seat formed at its outer end, a stuffing box located on the outside of the casing and surrounding the guide tube, a support for a fusible stop and an abutment against which the annular seat on the tube can be screwed, and a fusible stop for the plunger located to hold the valve open.

3. In combination with a valve casing adapted to be located in a conduit for fluid fuel, a valve, means tending to seat said valve, a plunger extending from the valve through the wall of the casing, a guide tube for the plunger screwing into the wall of the casing and extending beyond the same, said tube having an annular seat formed at its outer end, a support for a fusible stop and an abutment against which the annular seat on the tube can be screwed, and a fusible plate extending over an opening located in the path of the plunger, said plate acting as a stop for the plunger.

LUTHER D. LOVEKIN.